United States Patent [19]
Drexl

[11] Patent Number: 6,040,768
[45] Date of Patent: Mar. 21, 2000

[54] ARRANGEMENT FOR MONITORING THE WEAR STATUS OF A FRICTION CLUTCH

[75] Inventor: Hans-Jürgen Drexl, Schonungen, Germany

[73] Assignee: Mannesmann Sachs AG, Schweinfurt, Germany

[21] Appl. No.: 09/264,115

[22] Filed: Mar. 8, 1999

[30] Foreign Application Priority Data

Mar. 9, 1998 [DE] Germany .......................... 198 10 033

[51] Int. Cl.$^7$ ............................................. G08B 21/00
[52] U.S. Cl. .................. 340/453; 340/454; 73/118.1; 73/862.31
[58] Field of Search .................. 340/453, 454; 73/118.1, 862.31

[56] References Cited

U.S. PATENT DOCUMENTS

| | | | |
|---|---|---|---|
| 4,499,450 | 2/1985 | Makita | 340/453 |
| 4,651,142 | 3/1987 | Klatt | 340/453 |
| 4,848,531 | 7/1989 | Gray et al. | 192/13 R |
| 5,723,779 | 3/1998 | Hara et al. | 73/118.1 |
| 5,847,272 | 12/1998 | Schneider et al. | 340/453 |

FOREIGN PATENT DOCUMENTS 36 01 708    7/1987    Germany .......................... G01L 3/24

*Primary Examiner*—Edward Lefkowitz
*Attorney, Agent, or Firm*—Cohen, Pontani, Lieberman & Pavane

[57] ABSTRACT

An arrangement for monitoring the wear status of a friction clutch in the drivetrain of a motor vehicle driven by an internal combustion engine includes a wear detection circuit that responds to speed information representing the instantaneous input speed of the friction clutch supplied by a first speed sensor and to information supplied by a movement sensor representing the beginning of a starting process. The wear detection circuit supplies, as a measurement for the loading of the friction clutch during a starting process, load information which is a predetermined monotonic function of a value of the first speed information following the beginning of movement after a predetermined time interval. The monotonic function could also be of a mean value from a plurality of values of the first speed information succeeding one another at predetermined time intervals following the beginning of movement.

14 Claims, 2 Drawing Sheets

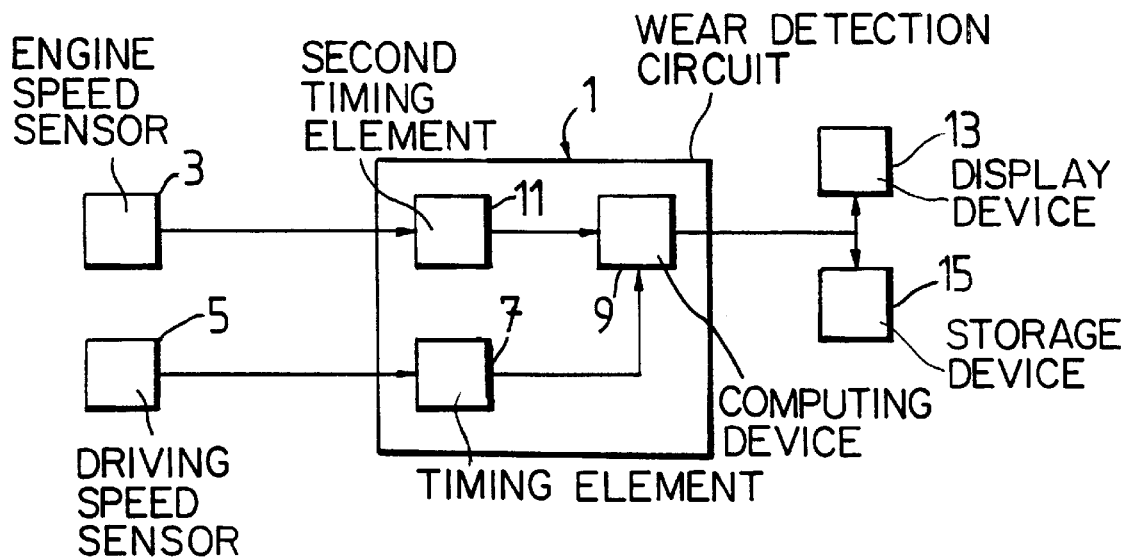
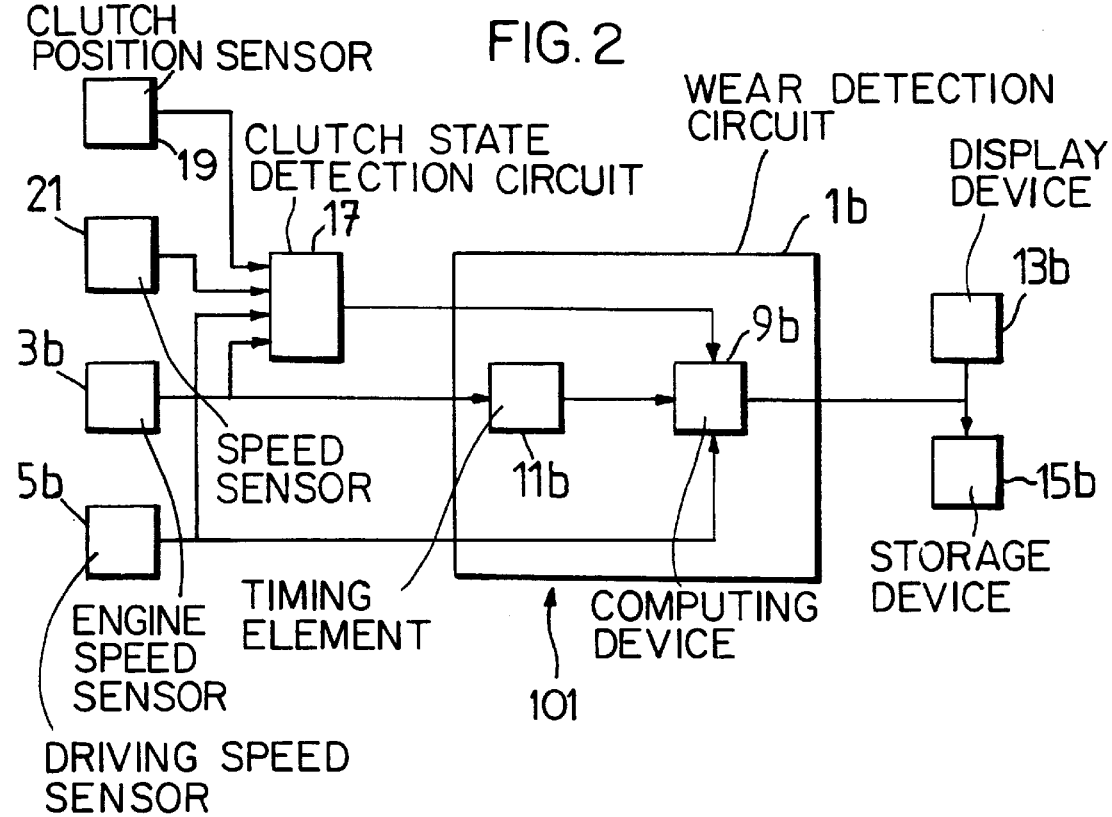

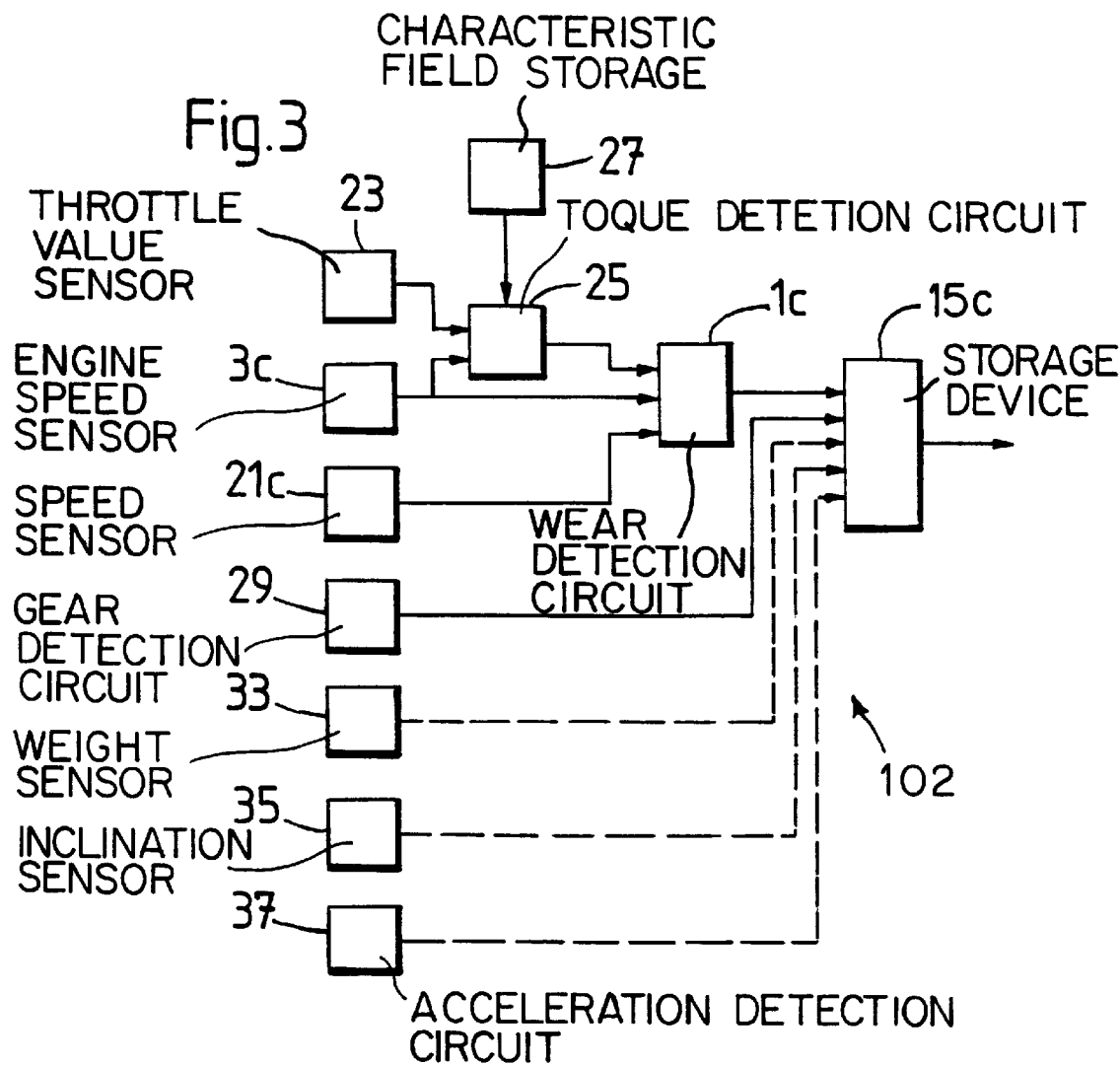
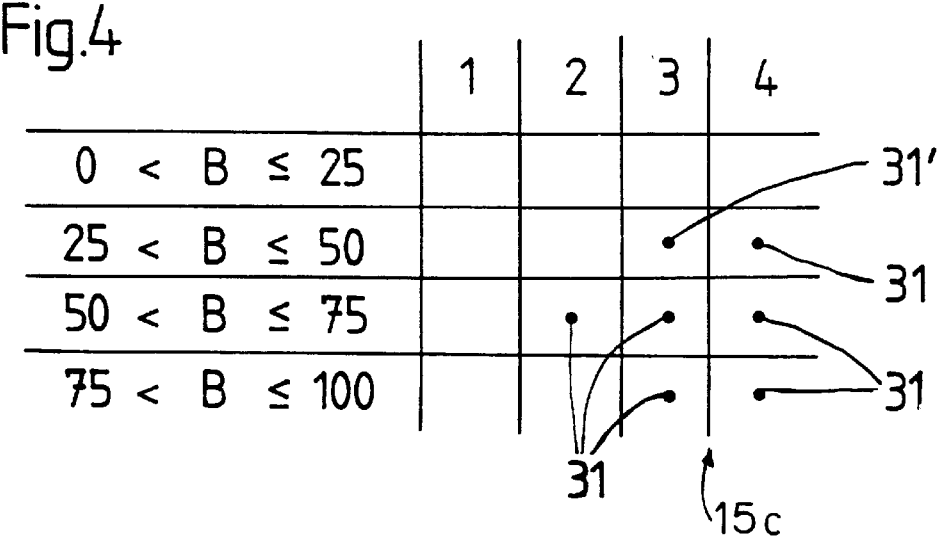

ARRANGEMENT FOR MONITORING THE WEAR STATUS OF A FRICTION CLUTCH

BACKGROUND OF THE INVENTION

1. Field of the Invention

The invention is directed to an arrangement for monitoring the wear status of a friction clutch in the drivetrain of a motor vehicle driven by an internal combustion engine.

2. Description of the Related Art

A prior art arrangement for monitoring the wear status of a friction clutch is disclosed in German reference DE-OS 36 01 708. In this prior art arrangement, a wear detection circuit determines the frictional output instantaneously consumed in the friction clutch. The instantaneous clutch slip is determined from the difference between the instantaneous input speed for the clutch detected by a first speed sensor and the instantaneous output speed of the clutch detected by a second speed sensor and is multiplied by the value of the torque instantaneously present at the clutch. This torque is determined from the clutch position detected by a clutch position sensor or from the amount of fuel supplied instantaneously to the internal combustion engine with the assistance of engine characteristic data. The arrangement integrates the frictional output values occurring during a clutch engagement process, adds the successive engagement processes of associated frictional output value integrals taking into account the clutch actuation rate, and compares the resulting sum with a threshold value. If the sum exceeds the threshold, the arrangement indicates this by actuating a display device.

The load information presented by the display device of the known arrangement is suitable for displaying an instantaneous overloading of the friction clutch. However, its characterization of the wear status of the friction clutch is too vague to provide information that the driver can use to reduce wear on the friction clutch during normal driving operation in which there is no overloading of the friction clutch by altering in some way the manner of operating the clutch, i.e., by changing the way that the driver operates the motor vehicle.

SUMMARY OF THE INVENTION

An object of the present invention is to provide a simply constructed arrangement for monitoring a friction clutch which supplies load information that is a good characterization of the wear of the friction clutch.

A first embodiment of the invention assumes that the majority of clutch wear during typical operation of a motor vehicle occurs during the starting processes. To detect the clutch load occurring during a starting process, the invention suggests an arrangement for monitoring the wear status of a friction clutch in the drivetrain of a motor vehicle driven by an internal combustion engine using a first speed sensor supplying first speed information representing the instantaneous input speed of the friction clutch and a wear detection circuit determining the load of the friction clutch during an engagement process as a function of the first speed information. In this case the wear detection circuit of the present invention responds to information from a movement sensor representing the beginning of a starting process and supplies, as a measurement for the loading of the friction clutch during a starting process, load information which is determined from a plurality of values of the first speed information following one another within a time period of predetermined length after the beginning of the starting process.

In addition to the assumption that a majority of the clutch wear occurs during starting processes, the invention further assumes that the input speed of the friction clutch occurring during the engagement process when starting sufficiently characterizes the load of the friction clutch during the starting process. To detect the beginning of the starting process, the arrangement comprises a movement sensor which can be formed, for example, by a driving speed sensor which is provided in any case in the motor vehicle or by a separately provided acceleration sensor.

With a suitable choice of the time period of predetermined length, only values of the first speed information at times in which the friction clutch is not yet completely engaged during typical starting processes so that the starting process is still in progress contribute in the determination of the load information. Preferred lengths of the time period of predetermined length are 1 to 7 seconds and, especially, 1.5 to 3 seconds.

To determine the load information from values of the first speed information which follow one another in time, the wear detection circuit preferably calculates a mean value from the plurality of values of the first speed information, wherein this mean value can be determined by arithmetic averaging or weighted averaging of the values of the first speed information.

The suggested arrangement accordingly makes it possible to supply load information characterizing the wear of the friction clutch in a very economical manner.

According to a further approach of the invention, the load of the friction clutch during a starting process increases as the input speed of the friction clutch increases during the starting process. Therefore, the invention further provides an arrangement for monitoring the wear status of a friction clutch in the drivetrain of a motor vehicle driven by an internal combustion engine with a first speed sensor supplying first speed information representing the instantaneous input speed of the friction clutch and a wear detection circuit determining the load of the friction clutch during an engagement process as a function of the first speed information. This arrangement is characterized in that the wear detection circuit responds to information from a movement sensor representing the beginning of a starting process and supplies, as a measurement for the loading of the friction clutch during a starting process, load information which is a predetermined monotonic function either of a value of the first speed information following the beginning of movement after a predetermined time interval or of a mean value from a plurality of values of the first speed information succeeding one another at predetermined time intervals following the beginning of movement.

In this respect, particularly the value of the first speed information following the beginning of movement after a predetermined time interval or the mean value of the plurality of values of the first speed information following one another at predetermined time intervals can themselves be used as the value of the load information. In addition to this especially simple monotonic relationship, any other function which is monotonic, i.e., the value of the load information increases as the value of the first speed information or the mean value of the plurality of values of this first speed information increases, may also be used.

The arrangement suggested according to this latter approach also makes it possible to supply load information characterizing the wear of the friction clutch in a very economical manner. In order for the load information to characterize the loading of the friction clutch during the starting process in the best possible manner, the duration during which the values of the first speed information which follow one another at predetermined time intervals are utilized for averaging is limited to the duration of the engagement process. For this reason, the wear detection circuit preferably responds to information of a clutch state detection circuit representing the end of the engagement process so that values of the first speed information occurring only until the end of the engagement process are used for determining the mean value.

In a particularly simple embodiment, the clutch state detection circuit responds to the first speed information representing the instantaneous input speed of the friction clutch and responds to driving speed information of a driving speed sensor which may possibly be provided in the motor vehicle in any case. The driving speed information represents the instantaneous driving speed of the motor vehicle. The end of the engagement process is determined by a comparison of the values of both the speed information and the driving speed information. When the friction clutch is engaged, these values are proportional to one another by a ratio predetermined by factors such as the transmission ratio of the gearbox in the instantaneously engaged gear and the tire diameter, etc. When the friction clutch is not fully engaged, the values to be compared do not develop so as to be proportional to one another with respect to time.

In a preferred embodiment, the clutch state detection circuit responds to the first speed information representing the instantaneous input speed of the friction clutch and to a second speed information supplied by a second speed sensor and representing the instantaneous output speed of the friction clutch. The end of the engagement process is determined from a comparison of the values of the two kinds of speed information. That is, when the friction clutch is fully engaged, the values of the first and second speed information are identical.

A further preferred clutch state detection circuit comprises a clutch position sensor which directly detects the position of, for example, a clutch release or clutch pedal and determines the completely engaged state of the friction clutch from the clutch position.

A display device which displays the value of the load information is preferably connected to the wear detection circuit so that a driver of the vehicle is informed of the wear of the friction clutch during the preceding starting process. The wear is characterized by the value of the load information. The driver can then optimize his method of driving with respect to reducing future clutch wear.

Further, a storage device may also be provided for storing at least a value indicating the wear of the friction clutch which is determined from load information corresponding to starting processes which have already taken place. For example, the storage device may store a mean value of the values of load information preceding in time or it can store a plurality of values indicating wear. Every value indicates the number of preceding starting processes in which the value of the load information lies in a value range associated with this value indicating wear. Further, the storage device can record all of the values of the load information associated with the preceding starting processes as values indicating the wear of the friction clutch. Based on a statistical analysis of these numbers, conclusions can be drawn about the driving style of the driver of the vehicle and the information obtained therefrom can be used to optimize the driver's driving style.

Enabling an analysis of the loading of the friction clutch occurring in starting processes that have already taken place is also a basic idea in a second embodiment of the invention. In the second embodiment, the load information during a starting process and supplemental information about the driving status of the vehicle during the starting process is taken into account for characterizing the wear status of the friction clutch. For this purpose, the invention proceeds from an arrangement for monitoring the wear status of a friction clutch in the drivetrain of a motor vehicle driven by an internal combustion engine. This arrangement has a wear detection circuit supplying load information as a measurement for the loading of the friction clutch during a starting process and a storage device for storing a plurality of values which indicate the wear of the friction clutch and which are determined from load information corresponding to starting processes that have already taken place. In this respect, the invention is characterized in that the storage device stores the values indicating wear in correspondence with at least one status datum from the following: gear position information of a gear detection circuit representing that gear position of a gearbox of the motor vehicle which is adjusted during the starting process, weight information of a weight sensor representing the instantaneous weight of the motor vehicle, inclination information of an inclination sensor representing the inclination of the motor vehicle relative to the horizontal in the driving direction during the starting process, and acceleration information of an acceleration detection circuit representing the acceleration of the motor vehicle during the starting process.

The storage of at least one status datum in correspondence with the values indicating wear improves the characterization of the wear status of the friction clutch and therefore the information which can be obtained from a subsequent analysis of the starting processes.

For example, if the values indicating wear that were determined in the gear position of the gearbox adjusted during the individual starting processes in correlation with the load information associated with the starting processes that took place beforehand are stored, it is possible to determine subsequently in an analysis of the stored values that, for example, an increased wear of the friction clutch is the result of a frequently incorrect selection of the gear position during the starting processes. In another example, if the instantaneous weight of the motor vehicle or the inclination of the motor vehicle in relation to the horizontal is stored in correlation with the values indicating wear, it can be determined, for example, that increased clutch wear is not caused by incorrect operation by the driver of the vehicle, but by a frequent high additional loading of the motor vehicle or by frequent starting processes when driving uphill. Further, if the acceleration of the motor vehicle during the starting process is stored in correlation with the values indicating wear, it can be ruled out, for example, that increased clutch wear is caused by excessively high accelerations during starting processes.

The storage device may comprise a plurality of storage locations, wherein there is associated with every starting process a storage location in which are stored the value indicating wear and the at least one status datum and possibly also the clock time at which the respective starting process took place, which makes possible a retroactive analysis of individual starting processes.

The storage device preferably comprises a large number of storage locations, each of which is associated with a predetermined range of values of the load information and a value or value range of at least one of the status data. In this connection, the storage device increments during every starting process that storage location which corresponds with respect to allocation to the value of the at least one status datum and to the value of the load information. Accordingly, every storage location represents the number of starting processes during which the values of the load information associated with these starting processes lay in that predetermined range of the value of the load information associated with the storage location and during which, at the same time, the individual values of the status information were identical to the value of the corresponding status information associated with this storage location or lay in that value range of the corresponding status information associated with this storage location. The entire storage device accordingly stores a frequency distribution from which the proportion of starting processes can be determined from the total number of starting processes during which classified values of the load information and the at least one status datum occurred.

For a particularly precise determination of the load information, the wear detection circuit preferably also uses clutch torque information which represents the torque instantaneously present at the input side of the friction clutch. For example, the load information can be determined in that the value of the torque present at the friction clutch is multiplied by the slip of the friction clutch, i.e., by the difference between the speed of the output side of the friction clutch and the speed of the input side of the friction clutch. In order to determine the clutch torque information, the wear detection circuit uses engine torque information which represents the torque instantaneously generated by the internal combustion engine and which is supplied by an engine torque detection circuit. The engine torque detection circuit can determine the engine torque information from the value of the engine speed and the amount of fuel instantaneously supplied to the engine with the aid of engine characteristic data. In this respect, the engine torque detection circuit can further use information about the prevailing air pressure and air temperature in the vehicle, for example.

In general, the engine torque information only approximately corresponds to the clutch torque information representing the torque present instantaneously at the input side of the friction clutch. Therefore, the wear detection circuit for determining the clutch torque information corrects the engine torque information by a value which is determined from acceleration information representing the instantaneous angular acceleration of the input side of the friction clutch and a predetermined value which essentially represents the moment of inertia of the internal combustion engine and of the input side of the friction clutch. The acceleration information can be calculated from the time dependence of the first speed information supplied by the first speed sensor or by a separate acceleration sensor which is provided at the internal combustion engine or at the input side of the friction clutch.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 shows a first embodiment of an arrangement for monitoring the state of wear of a friction clutch according to the present invention;

FIG. 2 shows a second embodiment of an arrangement for monitoring the wear status of a friction clutch according to the present invention;

FIG. 3 shows a third embodiment of an arrangement for monitoring the wear status of a friction clutch according to the present invention; and FIG. 4 shows a storage allocation for a storage device shown in FIG. 3.

DETAILED DESCRIPTION OF THE PRESENTLY PREFERRED EMBODIMENTS

FIG. 1 shows an arrangement 100 for monitoring the wear status of a friction clutch in the drivetrain of a motor vehicle driven by an internal combustion engine. The arrangement 100 comprises a wear detection circuit 1 which responds to first speed information representing the instantaneous input speed of the friction clutch and a movement speed of the motor vehicle. An instantaneous engine speed measured by an engine speed sensor 3 provided at the crankshaft of the internal combustion engine supplies the first speed information. The movement information is supplied as instantaneous driving speed by a driving speed sensor 5 provided at the motor vehicle. The instantaneous driving speed from driving speed sensor 5 is supplied to a timing element 7 of the wear detection circuit 1 which delivers a release signal to a computing device 9 of the wear detection circuit 1 as soon as the driving speed exceeds a threshold value of 0.5 km/h and accordingly indicates that the vehicle has been set in motion. After the expiration of a time period of predetermined length, for example, 3 s after the time at which the timing element 7 of the computing device 9 has supplied the release signal, the timing element 7 of the computing device 9 supplies a blocking signal. In the time period between the transmissions of the release signal and the blocking signal, the computing device 9 reads a plurality of engine speed values which are supplied to it by a second timing element 11. The plural engine speed values are transmitted by the second timing element 11 to the computing device 9 at predetermined time intervals of 100 ms relative to one another. The second timing element reads out the speed information of the engine speed sensor 3 in these time intervals and supplies the corresponding values to the computing device 9.

After the blocking signal is received by the computing device 9, the arithmetic mean value from the plurality of read out engine speed values is calculated and supplied as load information. The value of the delivered load information is a measurement for the wear of the friction clutch that occurred during the starting process.

The arrangement 100 is particularly simple because the driving speed sensor and the engine speed sensor are sensors that are usually provided in motor vehicles in any case. It is then assumed that the value of the engine speed or input speed of the friction clutch is a sufficiently good measurement for the clutch wear occurring during this engagement process. In this respect, it is further assumed that it is not at all necessary to monitor the input speed of the friction clutch to determine the load information during the entire engagement process when starting up, but rather it is sufficient to detect the input speed of the friction clutch during a time period of predetermined length, which is selected at 3 s in the present case, after the beginning of the starting process and to form the arithmetic mean value from the detected values.

The load information calculated by the computing device 9 is supplied to a display device 13 on the dashboard of the vehicle which digitally displays the value of the load information and therefore the value of the engine speed averaged over the first three seconds of the preceding starting process until the next starting process. Accordingly, the driver of the vehicle receives information about the clutch wear caused by the preceding starting process and can optimize his driving style accordingly to reduce clutch wear as far as possible.

The load information calculated and output by the computing device 9 is also transmitted to a storage device 15 which stores the load information together with the instantaneous clock time, so that the stored data can be read out at desired times, for example, when the vehicle is serviced, and the individual starting processes with the associated clutch wear can be analyzed.

FIG. 2 shows another embodiment of an arrangement 101 for monitoring the wear status of a friction clutch in the drivetrain of a motor vehicle. Components corresponding to one another with respect to construction and function are designated by the reference numbers from FIG. 1, but with the addition of a letter for purposes of distinguishing them. For explanation, reference is had to the preceding description in its entirety.

In the arrangement 100 shown in FIG. 1, only the values of the engine speed occurring during the time period of predetermined length of 3 s after the beginning of the starting process are used for the calculation of the load information. However, the arrangement 101 in FIG. 2 uses all of the values of the engine speed which follow one another at predetermined time intervals until the end of the engagement process for calculating the load information.

The arrangement 101 includes a clutch state detection circuit 17 to detect the end of the engagement process. The clutch state detection circuit 17 supplies a blocking signal to a computing device 9b of a wear detection circuit 1b when the friction clutch is completely engaged. The completely engaged state of the friction clutch is detected by a clutch position sensor 19 arranged at the clutch release mechanism of the friction clutch and which supplies a corresponding position signal to the clutch state detection circuit 17.

Alternatively, the completely engaged state of the friction clutch may also be indirectly detected by the clutch state detection circuit 17 by comparing the values of the instantaneous input speed of the friction clutch which are supplied by an engine speed sensor 3b with the values of the output speed of the friction clutch supplied by a speed sensor 21 which is provided at the output shaft of the friction clutch. A difference between the two values supplied instantaneously by the speed sensors 3b and 21 indicates the occurrence of a slip in the monitored friction clutch and the latter is consequently not completely engaged. Full engagement of the clutch is indicated when the values supplied instantaneously by the speed sensors 3b and 21 are identical. The clutch state detection circuit 17 sends the blocking signal to the computing device 9b.

As an alternative, the instantaneous driving speed of the motor vehicle supplied by a driving speed sensor 5b may be used instead of the output speed of the friction clutch supplied by the speed sensor 21 for the comparison with the engine speed. That is, the value of the instantaneous driving speed is proportional to the value of the instantaneous output speed of the friction clutch, wherein the ratio between the driving speed value and the speed value of the output side of the friction clutch is determined essentially by the transmission ratio of the gearbox of the motor vehicle during the instantaneously engaged gear and the tire diameter of the driving wheels of the motor vehicle. Accordingly, for a motor vehicle there is a number of ratios corresponding to the number of gears of the gearbox which adopt the engine speed values and the driving speed values relative to one another when the clutch is fully engaged. The clutch state detection circuit 17 can then send the blocking signal to the computing device 9b when it has determined by means of a comparison that the ratio between the engine speed value and the driving speed value during a predetermined time period of, for example, a half second, is equal to one of these ratios. This ratio at the same time represents the gear position of the gearbox selected in the engagement process and can be used in the embodiment form shown in FIG. 3 and described hereinafter for further processing.

The computing device 9b further responds to a start signal which is identical to the driving speed information supplied by the driving speed sensor as soon as the driving speed takes on a value other than zero. During the time period from the reception of the start signal to the reception of the blocking signal, the computing device 9b reads in values of the speed of the input side of the friction clutch which are supplied by the engine speed sensor 3b to the computing device 9b by the timing element 11b in predetermined time intervals. After receiving the blocking signal, the computing device 9b calculates the arithmetic mean value of the read in engine speed values, uses the calculated mean value as argument in a predetermined monotonically increasing function and delivers the corresponding calculated function value as load information. In this connection, the use of a monotonic function ensures that the load information has a value which increases as the mean value of the read in engine speed values increases.

Depending on the selection of the predetermined time interval, it may happen during a very short engagement process that only one engine speed value is read in by the computing device 9b between the occurrence of the release signal and the occurrence of the blocking signal. In this case, instead of the above-described mean value of the engine speed values, the individual engine speed value itself is used as argument of the monotonic function.

FIG. 3 shows an arrangement 102 in which a wear detection circuit 1c determines load information representing the wear during a starting process from the torque instantaneously present at the input side of the friction clutch and from the slip occurring between the output side and the input side of the friction clutch. For this purpose, a torque detection circuit 25 is connected to the wear detection circuit 1c for transmitting a value of the torque instantaneously generated by the internal combustion engine. The torque detection circuit 25 determines this engine torque value from the position of the throttle valve of the internal combustion engine supplied by a throttle valve sensor 23 and from a value of the engine speed supplied by an engine speed sensor 3c. The throttle valve position represents the amount of fuel supplied to the internal combustion engine at a given engine speed. A characteristic field storage 27 is interrogated by the engine torque detection circuit 25 as a function of the values of the throttle valve position and engine speed to determine the torque generated by the internal combustion engine. The torque value is then transmitted to the wear detection circuit 1c.

The torque value transmitted by the engine torque detection circuit 25 represents the torque value instantaneously present at the input side of the friction clutch only approximately since acceleration effects of the internal combustion engine and of the input side of the friction clutch are not taken into account by the engine torque detection circuit 25.

To determine the torque value present at the input side of the friction clutch more precisely, the wear detection circuit 1c corrects the engine torque value supplied by the engine torque detection circuit 25 with a value which depends on the angular acceleration, i.e., on the change in rotational speed of the input shaft of the friction clutch. The instantaneous angular acceleration value is calculated by a subtraction operation between the instantaneous engine speed value supplied by the engine speed sensor 3c and an engine speed value that preceded it at a predetermined time interval. This calculated angular acceleration value is multiplied by a predetermined value which essentially represents the moment of inertia of the rotating parts of the internal combustion engine and of the input side of the friction clutch and can be determined empirically. The predetermined value takes into account a factor that depends, for example, on the time interval between the engine speed values used for the subtraction operation. This value is added to or subtracted from the engine torque value supplied by the engine torque detection circuit 25, so that the engine torque value is reduced during a positive angular acceleration of the engine, i.e., increasing rotational speed of the engine, and this value is increased during a negative angular acceleration.

The results of this calculation are used by the wear detection circuit 1c as the torque instantaneously present at the input side of the friction clutch and are multiplied by the instantaneous slip of the friction clutch which it calculates from the difference between the value of the output speed of the friction clutch supplied by the speed sensor 21c and the value of the input speed of the friction clutch supplied by the engine speed sensor 3c. The results of this calculation represent the power instantaneously consumed in the friction clutch. The wear detection circuit 1c integrates these power values starting with the beginning of the starting process and up to the end of the engagement process to supply the results to a storage device 15c as load information representing the wear during the respective starting process.

The storage device 15c stores a plurality of values which indicate the wear of the friction clutch and which are determined from the load information associated with the preceding starting processes. The values indicating wear are stored so as to be correlated with gear position information which is supplied, as gear position value, by a gear detection circuit 29. The gear detection circuit 29 determines the instantaneously selected gear either by comparing the instantaneous driving speed value with the engine speed value, as was described above with respect to the clutch state detection circuit 17 in FIG. 2, or the gear detection circuit may also directly detect the gear position value by means of a gear position sensor which is provided separately at the gearbox of the motor vehicle.

Referring to FIG. 4, the storage device 15c comprises a plurality of storage locations 31, each of which is associated with a predetermined range of values of the load information and with a value of the gear position information. The storage device 15c has 16 storage locations 31 which can be arranged as a matrix. Every line of this matrix, each with four storage locations 31, is associated with a value of the gear position of four possible gear positions of the gearbox. The value ranges of the load information are four adjoining partial areas of an area of the load information supplied by the wear detection circuit 1c, which area is scaled to numerical values between 0 and 100.

When the load information assumes, for example, a value B in the value range $25<B\leq50$ during a starting process and the third gear is engaged during the starting process, the storage location designated by 31' is incremented, i.e., the value 1 is added to its stored content. Therefore, the individual storage locations 31 contain, as values indicating wear, the number of starting processes in which the load information lay in the value range of load information associated with the respective storage location and the engaged gear position is identical to the gear position value associated with the corresponding storage location 31.

During interruptions in operation for servicing the motor vehicle, the storage content of the storage device can be read and analyzed to trace the causes of, for example, a noticeably increased clutch wear. For example, if the analysis should show that starting is carried out in high gear, that is, in third or fourth gear, comparatively frequently, the driver of the vehicle can be advised to start in a lower gear in the future, when possible.

In addition to the gear position information or as an alternative to it, the storage device 13c may store the values indicating wear in association with other values, or value ranges, of additional information. Examples of the additional information may be value ranges of weight information which represents the instantaneous weight of the motor vehicle and is supplied by a weight sensor 33, value ranges of inclination information which is supplied by an inclination sensor 35 and represents the instantaneous inclination of the motor vehicle in the driving direction during the starting process, or value ranges of acceleration information supplied by an acceleration detection circuit 37 and representing the acceleration of the motor vehicle during the starting process. This additional information, like the gear position information, is information pertaining to features of the starting process which is particularly relevant for wear of the friction clutch. For example, the selection of a high gear position or a high motor vehicle weight caused by a large added load or a large inclination of the motor vehicle with respect to the horizontal occurring uphill during a starting process or a large acceleration of the motor vehicle during the starting process result in clutch wear.

If the values indicating wear are associated with more than one type of additional information, the arrangement of the storage locations in a matrix configuration according to FIG. 4 can be supplemented to form an arrangement of storage locations with additional dimensions, for example, at least a cubic arrangement.

In addition to the supplemental information indicated in the description according to FIG. 3, it is possible to store further supplemental information, for example, identification representing a particular driver of a plurality of drivers of the vehicle, or identification representing the coupled state of a trailer, in association with the values indicating wear.

In addition to the wear detection circuit 1c, described in FIG. 3, which determines the load information from the torque value generated by the internal combustion engine and from the clutch slip, it is also possible to use wear detection circuits according to FIGS. 1 and 2.

Further, it is possible that the computing device in the arrangement 101 according to FIG. 2 reads only one individual engine speed value for determining load information after the beginning of the starting process, so that, in order to further simplify the circuit, the timing element 11b and the clutch state detection circuit 17 for supplying the blocking signal are no longer required.

In the arrangements 100 and 101 shown in FIGS. 1 and 2, the speed information representing the rotational speed of the input side of the friction clutch is supplied by a speed sensor 3, 3a provided at the crankshaft of the internal combustion engine. Alternatively, a speed sensor may also be provided at the flywheel of the internal combustion engine or at the input shaft of the friction clutch. Further, the information representing the beginning of the starting process is supplied by the driving speed sensor of the motor vehicle in these arrangements, wherein, alternatively, this information is also supplied by a speed sensor arranged at the transmission output shaft or transmission input shaft or by a separate acceleration sensor.

The invention is not limited by the embodiments described above which are presented as examples only but can be modified in various ways within the scope of protection defined by the appended patent claims.

I claim:

1. An arrangement for monitoring the wear status of a friction clutch in the drive train of a motor vehicle, comprising:

a wear detection circuit for determining load information of the friction clutch;

a first speed sensor operatively connectable in the motor vehicle for detecting an instantaneous input speed of the friction clutch and transmitting a first speed information to said wear detection circuit in response to said input speed of the friction clutch;

a movement sensor operatively connectable to the motor vehicle for determining a beginning of a starting process and transmitting a beginning of starting process signal to said wear detection circuit; and said wear detection circuit determining said load information from at least one value of said first speed information within a time period after receiving said beginning of starting process signal.

2. The arrangement of claim 1, wherein said at least one value of said first speed information comprises a plurality of values of the first speed information and the load information is determined from a mean value of said plural values of the first speed information.

3. The arrangement of claim 1, wherein said time period comprises a length within the range including 1 to 7 seconds.

4. The arrangement of claim 1, wherein said time period comprises a length within the range including 1.5 to 3 seconds.

5. The arrangement of claim 1, wherein said load information comprises a predetermined monotonic function comprising one of a value of said first speed information after the time interval following said beginning of starting process signal and a mean value of a plurality of values of the first speed information succeeding one another in the time interval following the beginning of starting process signal.

6. The arrangement of claim 1, further comprising a clutch state detection circuit operatively connectable in the motor vehicle for determining when the clutch is fully engaged and outputting an end of the engagement process signal when the clutch is fully engaged, wherein said wear detection circuit is operatively connected to said clutch state detection circuit for receiving the end of the engagement process signal; and said load information comprising a monotonic function of the mean value of a plurality of values of the first speed information which follow one another at a predetermined time period and occur from the time said wear detection circuit receives said beginning of starting process signal until the time said wear detection circuit receives said end of the engagement process signal.

7. The arrangement of claim 6, wherein said movement sensor outputs a driving speed information representing an instantaneous driving speed of the vehicle;

said clutch state detection circuit is connected to said movement sensor and said first speed sensor for determining said end of the engagement process by a comparison of the value of said driving speed information with the value of said first speed information.

8. The arrangement of claim 6, further comprising a second speed sensor operatively connected for determining the instantaneous output speed of the friction clutch and outputting a second speed information in response to said instantaneous output speed of said friction clutch, wherein said clutch state detection circuit is connected to said first and second speed sensors for determining said end of the engagement process by a comparison of the value of the second speed information with the value of the first speed information.

9. The arrangement of claim 6, wherein said clutch state detection circuit comprises a clutch position sensor.

10. The arrangement of claim 1, further comprising a display device operatively connected to said wear detector circuit for displaying the value of the load information.

11. The arrangement of claim 1, further comprising a storage device for storing at least a value indicating the wear of the friction clutch which is determined from load information corresponding to starting processes which have already taken place.

12. The arrangement of claim 1, further comprising a storage device connected to said wear detection circuit for storing a plurality of values which indicate the wear of the friction clutch determined from load information corresponding to starting processes that have already taken place;

one of a gear detection circuit for determining a gear position information of a gearbox of the motor vehicle during a starting process, a weight sensor for determining a weight information of the motor vehicle during a starting process, an inclination sensor for determining an inclination information of a motor vehicle during a starting process, and an acceleration detector for determining an acceleration information of the motor vehicle during a starting process; and said storage device stores said values indicating wear in correspondence with at least one status datum from the group including gear position information, weight information, inclination information, and acceleration information.

13. The arrangement of claim 12, wherein said storage device comprises a plurality of storage locations, each said plural storage locations being associated with a predetermined range of values of load information and with one of a value and range of values of said at least one status datum.

14. The arrangement of claim 11, further comprising an engine torque detection circuit for outputting an engine torque signal representing an engine torque instantaneously generated by the engine of the motor vehicle, said wear detection circuit being connected to said engine torque detection circuit and said first speed sensor for determining a torque instantaneously present at the input side of the friction clutch by correcting the engine torque signal using a correction value determined from acceleration information representing the instantaneous angular acceleration of the input side of the friction clutch and a predetermined value representing the moment of inertia of the internal combustion engine and the input side of the friction clutch.

* * * * *